UNITED STATES PATENT OFFICE.

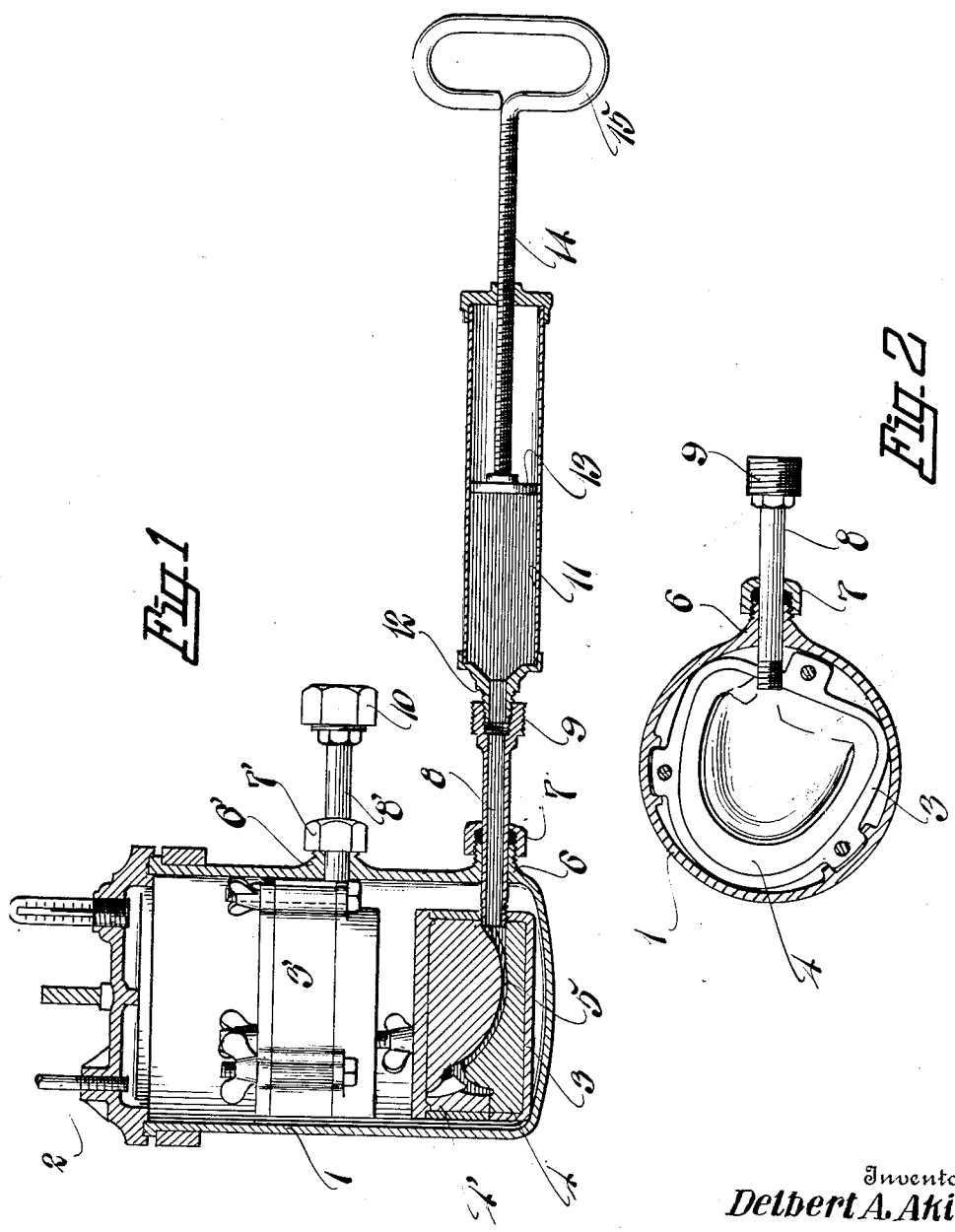

DELBERT A. AKIN, OF SPOKANE, WASHINGTON, ASSIGNOR OF ONE-THIRD TO JOHN MECKAY AND ONE-THIRD TO EARL F. FULLER, BOTH OF SPOKANE, WASHINGTON.

DENTAL FLASK AND CHARGER.

1,353,942.   Specification of Letters Patent.   Patented Sept. 28, 1920.

Application filed February 19, 1920. Serial No. 359,913.

*To all whom it may concern:*

Be it known that I, DELBERT A. AKIN, a citizen of the United States, residing at Spokane, in Spokane county and State of Washington, have invented certain new and useful Improvements in Dental Flasks and Chargers, of which the following is a specification.

My present invention relates to an improved dental flask and charger for forcing plastic material, as rubber, into the matrix of the dental mold or flask for vulcanization of the dental plate and the teeth clamped in the matrix between the mold members of the flask. According to my invention the flask for vulcanizing the dental plate is first inclosed within the steam vulcanizer, and after the proper or required steam pressure is supplied to the interior of the vulcanizer, the plastic composition is forced by the charging device into the matrix of the inclosed flask at a lower pressure than that of the steam pressure in the vulcanizer.

The steam pressure is of course excluded from the matrix or interior of the mold, and thus while adequate pressure is provided by the charger for supplying the exact quantity of plastic material to the matrix, yet the pressure of steam, and the temperature of heat in the vulcanizer necessary for vulcanization, prevents disturbance of the mold and thus avoids danger of the production of distorted or irregular plates, due to the dislocation of the mold members, or the teeth within the matrix.

By the utilization of my method and the physical embodiment of my invention, I am enabled to supply the exact quantity of plastic material to the matrix to fill it in such manner as to produce a perfect and smoothly finished casting, which, without further treatment and accompanying loss of time and labor, is ready for application and use.

In the accompanying drawings I have illustrated one complete example of my invention in actual practice, wherein the parts are combined and arranged according to the best mode I have so far devised for the practical application of the invention, and it will be understood that colorable changes and alterations may be made in the structure as depicted, within the scope of my claims without departing from the spirit of my invention.

Figure 1 is a view in vertical section through a well known type of dental vulcanizer and flask therein, with which is combined the novel features and elements of my invention.

Fig. 2 is a transverse view through the vulcanizer showing the lower portion of the matrix, and the charging pipe connected thereto.

In the preferred form of the invention as illustrated in the drawings I have depicted the well known steam vulcanizer 1 used in the mechanical branch of the dental art, which is supplied with steam heat for vulcanization or hardening of the plastic composition, as rubber, through the steam inlet pipe 2 in the top of the cylindrical casing or vulcanizer, and within the vulcanizer are shown two flasks as 3 and 3' of the variety used in dental casting. The usual pair of mold members 4 and 4' are clamped within the flask, forming between them the matrix or cavity 5 for the reception of the plastic rubber when casting the dental plate.

For converting the vulcanizer to be used in accordance with my invention I fashion the metallic casing or cylinder with a pair of hollow, exteriorly threaded bosses 6 and 6', one near the bottom of the vulcanizer and the other nearer the center thereof, adjacent to the location of the flasks 3 and 3'. The bosses are each provided with a stuffing box as 7 and 7' to prevent escape of steam from the vulcanizer, and a pair of charging pipes 8 and 8' are illustrated as entering the bosses, the pipe 8 being equipped with a threaded socket member 9, and the pipe 8' being closed by the threaded nut 10, when not in use, as indicated.

The plastic composition or rubber to be vulcanized is introduced through the charge pipe 8 by the action of a charging gun of well known type embodying the cylindrical reservoir or barrel 11, the reduced threaded head 12 adapted to engage the socket 9, the piston head 13, screw-stem or plunger 14 and turning handle 15 on the threaded plunger or plunger bar.

In actual practice, the flasks are placed within the vulcanizer, after the matrix has been prepared, and the artificial teeth to be vulcanized to the plate have been placed in proper situation, and the charge pipe 8 is threaded into the orifice 8ª, prepared therefor in the flask, in such manner that the charge pipe communicates with the interior of the matrix or cavity between the two mold members 4 and 4'.

The "gun" or charging device is then threaded with its head 12 in the socket 9 of the charge pipe, ready for use. Before the charge is flowed into the matrix however, the steam for vulcanization is admitted to the vulcanizer by turning a suitable controlling valve, and the steam pressure fills the interior of the vulcanizing cylinder, the pressure being equalized all around the flask 3 and the members thereof are thus prevented from being disturbed. The charging device is now operated by turning the handle 15, to gradually force the plastic material from the reservoir through the charging pipe and into the matrix and the material flows evenly and uniformly into the matrix, filling every space therein with the exact quantity of material required. The superior pressure of the steam in the vulcanizer over that exerted by the charging device holds the members of the mold against movement by the lesser pressure of the flowing plastic material, and thus any dislocation of parts is eliminated, with the result that a finished casting is provided, requiring no further treatment, and ready for use.

When one or the other of the charging pipes 8 or 8' is not in use, the nut or cap 10 is threaded over the exterior threads of the socket member 9, and as will be seen in the drawings, the head 12 of the charging device is exteriorly threaded to engage the interior threads of the socket member 9.

By the utilization of my method and means of charging the mold within the vulcanizer the manufacture of rubber dental plates is simplified to a great extent, the manufacture of a comparatively perfect plate is insured, and the charging of the matrix after the flask has been inclosed in the vulcanizer and the steam pressure supplied obviates many objectionable features present in the practice of flowing the material into the flask before the latter is placed in the vulcanizer. In actual practice skill is required and experience is necessary in the performance of charging the matrix with the exact quantity of plastic material to thoroughly fill the matrix without an excess or over supply of material, but by the utilization of this combination of elements, those skilled in the art are enabled to produce perfect dental plates, with despatch and a considerable saving in time and labor, and the plates are ready for fitting and use.

What I claim is—

1. The combination with the vulcanizer adapted to receive steam pressure as a heating medium and the flask having a matrix therein, of a charging pipe, passed through the wall of the vulcanizer and entered into said flask to open into the matrix, said pipe having a socket end, and a charging device having a head to engage said socket in operative position for flowing plastic material into the matrix.

2. The combination with a dental vulcanizer adapted to receive steam under pressure as a heating medium, and a flask having a matrix therein, of a charging pipe passed through the vulcanizer wall and opening into said matrix, and means for forcing plastic material through said pipe at a pressure lower than the steam pressure in the vulcanizer.

3. The method of vulcanizing dental plates which consists in inclosing a flask and matrix within a vulcanizer, introducing steam to the vulcanizer at a relatively high pressure and flowing plastic material to the matrix exclusive of the vulcanizer at a lower pressure than the steam pressure within the vulcanizer.

In testimony whereof I affix my signature.

DELBERT A. AKIN.